(12) United States Patent
Kramer (10) Patent No.: US 11,788,594 B2
(45) Date of Patent: Oct. 17, 2023

(54) SYSTEMS AND METHODS FOR MONITORING A WEAR STATE OF A DISC BRAKE

(71) Applicant: Webb Wheel Products, Inc., Cullman, AL (US)

(72) Inventor: Jason Kramer, Cullman, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 236 days.

(21) Appl. No.: 17/245,429

(22) Filed: Apr. 30, 2021

(65) Prior Publication Data

US 2022/0349451 A1 Nov. 3, 2022

(51) Int. Cl.
*F16D 66/02* (2006.01)
*B60T 17/22* (2006.01)

(52) U.S. Cl.
CPC ............ *F16D 66/027* (2013.01); *B60T 17/22* (2013.01)

(58) Field of Classification Search
CPC ............................... F16D 66/027; B60T 17/22
See application file for complete search history.

(56) References Cited

U.S. PATENT DOCUMENTS

| | | | | |
|---|---|---|---|---|
| 9,599,179 | B2 * | 3/2017 | Bahrami Ziarani | .. F16D 66/026 |
| 10,578,177 | B2 * | 3/2020 | Huang | ................... F16D 66/026 |
| 2002/0104717 | A1 * | 8/2002 | Borugian | .............. F16D 66/021 |
| | | | | 188/1.11 E |
| 2012/0212335 | A1 | 8/2012 | Bahrami Ziarani et al. | |
| 2019/0162256 | A1 | 5/2019 | Taylor et al. | |
| 2020/0309217 | A1 | 10/2020 | Ruiz et al. | |
| 2020/0340542 | A1 | 10/2020 | Jungmann | |

FOREIGN PATENT DOCUMENTS

| | | |
|---|---|---|
| CN | 108825688 | 11/2018 |
| DE | 102018121858 | 3/2020 |
| DE | 102018121859 | 3/2020 |
| DE | 102018122011 | 3/2020 |
| DE | 102018122882 | 3/2020 |

(Continued)

OTHER PUBLICATIONS

German Patent No. DE 102017002148 published Sep. 21, 2017 to Mellberg.*

(Continued)

*Primary Examiner* — Pamela Rodriguez
(74) *Attorney, Agent, or Firm* — ANDRUS INTELLECTUAL PROPERTY LAW, LLP (57) ABSTRACT

Systems and methods are for monitoring a wear state of a disc brake for braking a rotor of a vehicle. The disc brake has a caliper configured to clamp opposing inner and outer brake pads onto the rotor. A primary wear sensor is configured to sense a combined thickness of the rotor, the inner brake pad, and the outer brake pad. A controller is programmed to calculate an estimated wear amount of the inner brake pad and an estimated wear amount of the outer brake pad based upon the combined thickness. In some embodiments a secondary wear sensor is included and the system is configured to calculate an actual wear amount of the inner brake pad and an actual wear amount of the outer brake pad based upon input from the primary wear sensor and the secondary wear sensor.

21 Claims, 10 Drawing Sheets

(56) References Cited

FOREIGN PATENT DOCUMENTS

| | | |
|---|---|---|
| DE | 102018122884 | 3/2020 |
| EP | 0566006 | 10/1993 |
| EP | 2458240 | 5/2012 |
| EP | 3324069 | 3/2019 |
| EP | 3717323 | 10/2020 |
| KR | 101639277 | 7/2016 |

OTHER PUBLICATIONS

Chinese Patent No. CN 108343692 published Jul. 31, 2018 to Su et al.*
Translation of the description of Chinese Patent No. CN 108343692 obtained from website: https://worldwide.espacenet.com on Feb. 22, 2023.*
Translation of the claims of Chinese Patent No. CN 108343692 obtained from website: https://worldwide.espacenet.com on Feb. 22, 2023.*
Extended European Search Report issued in Corresponding EP Patent Application No. 22170710.2, dated Sep. 21, 2022.

* cited by examiner

SYSTEMS AND METHODS FOR MONITORING A WEAR STATE OF A DISC BRAKE

FIELD

The present disclosure relates to disc brakes for wheels, and more particularly to disc brakes having calipers.

BACKGROUND

The following provides background information related to the present invention.

EP Patent Publication No. 0566,006 discloses a lining wear detector for an air-operated disc brake which has a brake caliper which surrounds a brake disc and on one side of which is arranged an application device. The application device acts via at least one actuating spindle and a pressure piece seated on the end of the latter facing the brake disc on a brake pad mounted on the application-device side in the brake caliper in a manner which allows it to be displaced relative to the brake disc. An adjusting device is coupled rotationally to the actuating spindle keeping essentially constant the release clearance, which varies due to lining wear. The adjusting device is coupled to an angle-of-rotation sensor, the output signal of which corresponds to the instantaneous lining wear. To form a signal which represents a clear value for the lining wear, the adjusting device is coupled to a reduction gear which reduces the total number of revolutions performed by the adjusting device during the entire adjusting cycle to a maximum of one revolution and the output of which actuates an angle-of-rotation sensor.

EP Patent Publication No. 3,717,323 discloses a disc brake, preferably operated by compressed air, in particular for a motor vehicle. The disc brake has a brake caliper which extends over a brake disc, is designed as a sliding caliper, and is mounted on a stationary brake carrier such that it can be guided. Two brake pads are arranged in the brake caliper and can move in opposite directions. A clamping device has a brake rotary lever. Two threaded pistons are screwed in a bridge. The bridge cooperates with the clamping device, preferably with the brake rotary lever. A wear adjustment device has an adjustment device which is associated with one threaded piston of the threaded pistons and has a driver device which is associated with the other threaded piston. A monitoring device and a synchronizing device are provided by which the threaded pistons are coupled such that a rotational movement of one threaded piston about an adjustment axis causes a corresponding rotational movement of the other threaded piston about a driver axis, and vice versa. The monitoring device comprises an arrangement for monitoring the condition of the disc brake using a modular assembly of sensors.

Additional patent publications providing background information include: EP 2,458,240; EP 3,324,069; US 2019/0162256; US 2020/00309217; and US 2020/0340542.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a system for monitoring a wear state of a disc brake for braking a rotor of a vehicle. The system comprising a disc brake having a caliper configured to clamp opposing inner and outer brake pads onto the rotor. A primary wear sensor is configured to sense a combined thickness of the rotor, the inner brake pad, and the outer brake pad. A controller is programmed to calculate an estimated wear amount of the inner brake pad and an estimated wear amount of the outer brake pad based upon the combined thickness of the rotor, the inner brake pad, and the outer brake pad sensed by the primary wear sensor.

In certain examples, a system is for monitoring a wear state of a disc brake for braking a rotor of a vehicle, the system comprising a disc brake having a caliper configured to clamp opposing inner and outer brake pads onto the rotor. A primary wear sensor is configured to sense a combined thickness of the rotor, the inner brake pad, and the outer brake pad. A controller is programmed to calculate an estimated wear amount of the inner brake pad and an estimated wear amount of the outer brake pad based upon the combined thickness. In certain examples, the system includes a secondary wear sensor that senses movement distance of the caliper. The controller is programmed to calculate an actual wear amount of the inner brake pad and an actual wear amount of the outer brake pad based upon the combined thickness sensed by the primary wear sensor and the movement distance of the caliper sensed by the secondary wear sensor. Corresponding methods are herein disclosed.

Various other features, objects, and advantages of the invention will be made apparent from the following description taken together with the drawings.

BRIEF DESCRIPTION OF THE DRAWINGS

The present disclosure refers to the following drawing Figures.

DETAILED DESCRIPTION

During research and development in the field of disc brakes, the present inventor determined it would be advantageous to provide systems and methods for monitoring wear conditions of the disc brake, including the rotor and the inner and outer friction members of the brake pads. The present inventor also determined that known systems and methods for monitoring wear conditions of disc brakes can be unreliable and often require disposable sensors that require replacement after a single use, for example wear sensors located in the brake pad of the disc brake. Prior art systems and methods are also often difficult to integrate into existing brakes and require multiple sensors mounted at various locations. Many of such known systems and methods are needlessly complicated and expensive. The present disclosure arose during the inventor's efforts to overcome these disadvantages of the prior art.

Figure 1:
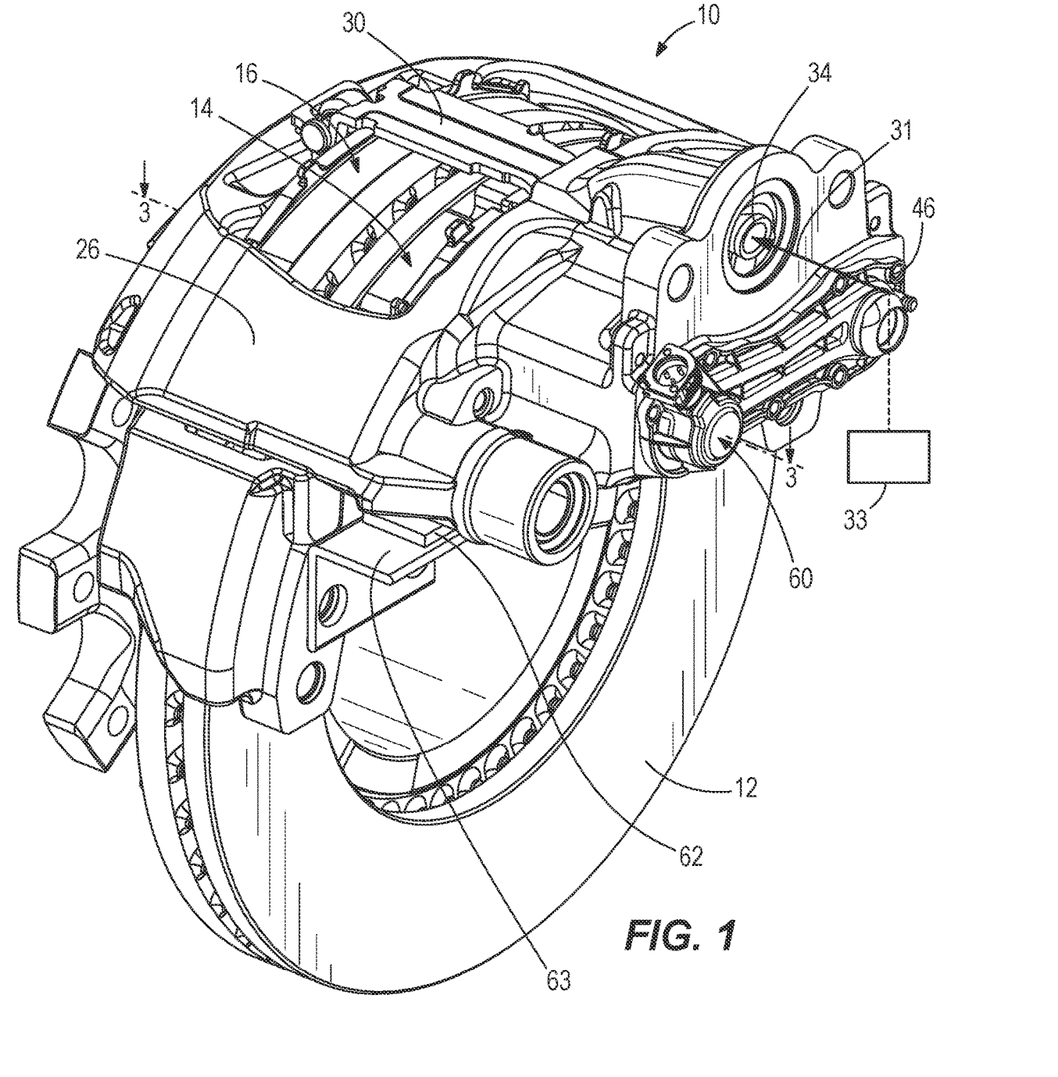
FIG. 1 is a perspective view of an exemplary disc brake for braking a rotor coupled to the wheel of a vehicle.
Figure 2:
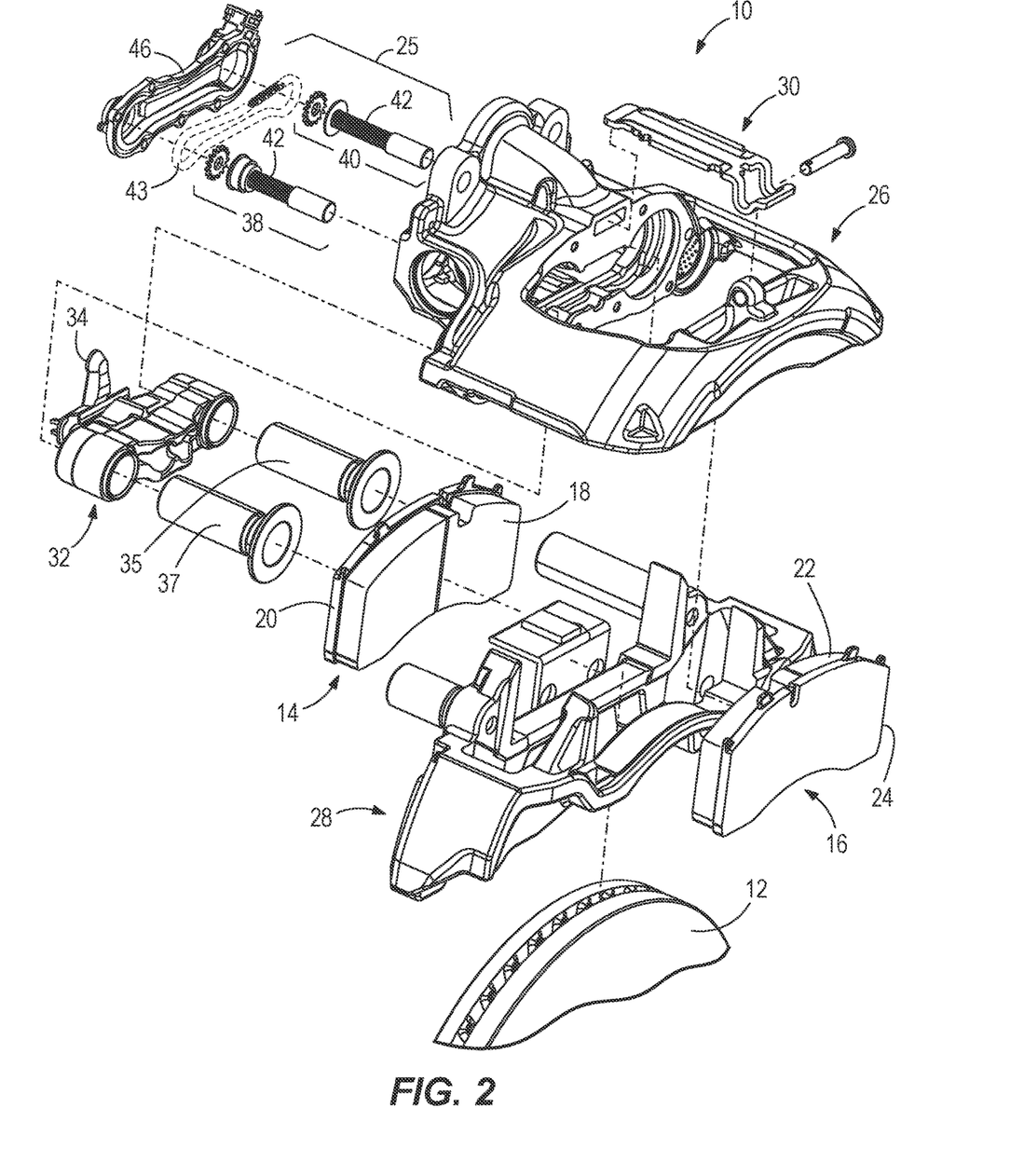
FIG. 2 is an exploded view of the disc brake and rotor.
Figure 3:
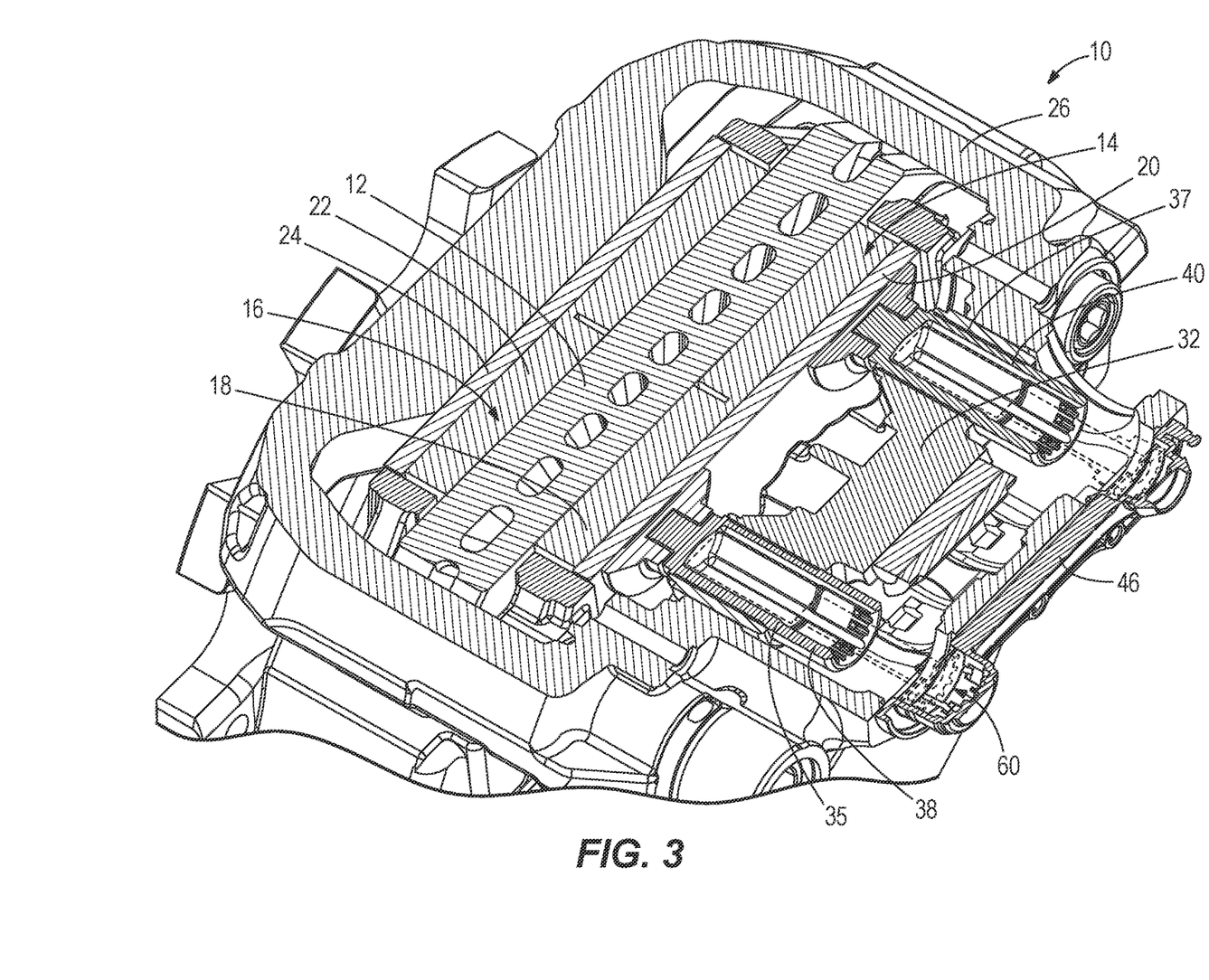
FIG. 3 is a view of section 3-3 taken in FIG. 1.

FIGS. 1-3 illustrate an exemplary disc brake 10 for braking a rotor 12 coupled to the wheel of a vehicle. The disc brake 10 is configured to clamp opposing inner and outer brake pads 14, 16 onto opposite sides of the rotor 12, to thereby apply a braking force that stops rotation of the rotor 12 and thus stop rotation of the corresponding wheel of the vehicle. The inner brake pad 14 includes an inner friction member 18 for frictionally engaging the inner side of the rotor 12 and an inner backing plate 20 that supports the inner friction member 18. The outer brake pad 16 includes in outer friction member 22 for frictionally engaging the outer side of the rotor 12 and an outer backing plate 24 that supports the outer friction member 22. The disc brake 10 further includes a caliper housing 26, a carrier 28 that contains the inner and outer brake pads 14, 16, and an adjuster 25 that automatically adjusts the position of the inner and outer brake pads 14, 16 relative to the rotor 12, for example as the inner and outer friction members 18, 22 and rotor 12 wear down, as is conventional. The carrier 28 is fixed to the vehicle, for example via a bracket secured to the vehicle's axle. The caliper housing 26 is slide-able relative to the carrier 28, as further described herein below. A removable retainer clip 30 retains and facilitates removal and replacement of worn inner and outer brake pads 14, 16. An actuator block 32 contains an input lever 34 for actuating the disc brake 10, as further described herein below.

The manner in which the disc brake 10 operates to brake the rotor 12 is conventional. When the operator depresses a brake pedal in the cab of the vehicle, a compressed air chamber 33 on the vehicle applies an input force on an input lever 34. See arrow 31 in FIG. 1. Compressed air chambers 33 for actuating a spring brake are conventional and thus not further herein described. This moves the inner friction member 18 axially into frictional braking engagement with the rotor 12. Braking engagement of the inner friction member 18 on the rotor 12 generates a reaction force on the caliper housing 26, which causes the caliper housing 26 to axially slide along guide sleeves 35, 37 relative to the carrier 28, in an opposite direction to arrow 31. This moves the outer friction member 22 of the outer brake pad 16 into frictional braking engagement with the outer side of the rotor 12.

Over time, the sides of the rotor 12 and the inner and outer friction members 18, 22 wear down from the frictional engagements, such that the thicknesses of these components decrease. Normally this would increase the size of the gap A (see FIG. 5) between the inner and outer friction members 18, 22 and the opposite sides of the rotor 12 when the disc brake 10 is at rest. However to prevent this, it is known to provide the adjuster 25, which actively maintains the gap A at a constant value over the wear life of the respective components. The adjuster 25 automatically adjusts the axial positions of the inner and outer brake pads 14, 16 relative to the rotor 12 as the components wear down, thereby maintaining a constant gap A. Generally, the adjuster 25 has primary and secondary adjuster assemblies 38, 40, each having a stem 42 configured to rotate upon wear of the inner and outer brake pads 14, 16 and rotor 12, which causes axial (ratcheting) movement of the stems 42. The primary adjuster assembly 38 is coupled to the secondary adjuster assembly 40 via a chain 43 such that rotation of the primary adjuster assembly 38 causes commensurate rotation of the secondary adjuster assembly 40. A chain cover 46 encloses the adjuster 25 within the caliper housing 26. The adjuster 25 thus maintains a predetermined gap A (see FIG. 5) between the inner friction member 18 and the rotor 12 and between the outer friction member 22 and the rotor 12 during wear of these components. The adjustment carried out by the adjuster 25 is dependent upon the travel of the actuator block 32. A predetermined clearance is defined to allow initial travel of the guide sleeves 35, 37 without unnecessary adjustment. Wear on the system will allow the actuator block 32 to travel beyond the defined clearance resulting in an adjustment via an axial movement in the primary adjuster assembly 38 and therefore secondary adjuster assembly 40. The type and configuration of the adjuster 25 is conventional and can vary from what is shown and described. Some alternate examples are taught in patents cited in the Background section of the present disclosure, and other examples are available for purchase from MEI Brakes.

As stated above, the type and configuration of the disc brake 10 and rotor 12 and operation of the disc brake 10 are conventional and for the objectives of the present disclosure can vary significantly from what is shown and described.

Figure 4:
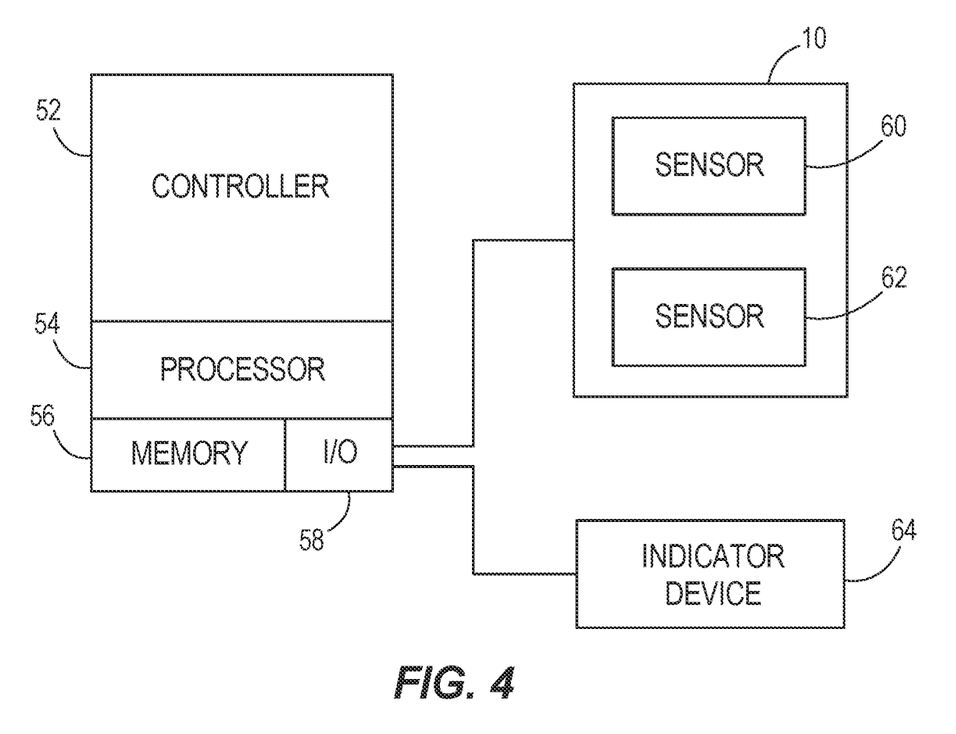
FIG. 4 is a schematic diagram illustrating a system according to the present disclosure.

FIG. 4 is a system diagram illustrating certain components of a system 50 for monitoring wear state of the disc brake 10 according to the present disclosure. The system 50 includes a controller 52 having a processor 54, a memory 56 (i.e., storage), and one or more conventional input/output device 58 (i.e., electronic interface(s)), which can be wired and/or wireless. The processor 54 loads and executes software from the memory 56. Executing the software controls the system 50 as described in further detail herein below. The processor 54 can include a microprocessor and/or any other known circuitry that receives and executes software from memory 56. The controller 52 can be implemented within a single device, however it can alternately be distributed across multiple devices and/or subsystems that cooperate in executing the methods described below. Examples include general purpose central processing units, application specific processors, and logic devices, as well as any other processing device, combinations of processing devices, and/or variations thereof. The controller 52 can be located anywhere with respect to the disc brake 10 and can communicate with various components of the vehicle via wired and/or wireless links, examples being shown in FIG. 4. The memory 56 can include any storage media that is readable by the processor 54 and capable of storing the software. The memory 56 can include volatile and/or nonvolatile, removable, and/or non-removable media implemented in any method or technology for storage of information, such as computer readable instructions, data structures, program modules, or other data. The memory 56 can be implemented as a single storage device but may also be implemented across multiple storage devices or subsystems. The input/output device 58 can include any one of a variety of conventional computer input/output interfaces for receiving electrical signals for input to the processor 54 and for sending electrical signals from the processor 54 to various components of the disc brake 10.

The system 50 includes a primary sensor 60, which in the illustrated embodiment is a rotary potentiometer. One suitable example can be purchased from Webb Wheel, part number KS0340 Stepped Sensor Fitted. Other types of sensors for sensing position of the respective components could also or instead be used. In the illustrated example, the primary sensor 60 is mounted on the outer end of the secondary adjuster assembly 40 and is configured to sense rotation of the secondary adjuster assembly 40 during the above-described automatic adjustments made by the adjuster 25. The primary sensor 60 outputs signals to the controller 52 correlating to the axial movement of the adjuster 25 and thus correlating to a combined thickness of the rotor 12, inner brake pad 14, the outer brake pad 16, as will be further described herein below.

The system 50 can be configured to monitor wear states of the disc brake 10 based solely upon inputs from the primary sensor 60, as further described herein below with reference to FIG. 7.

Optionally, the system 50 includes a secondary sensor 62 configured to detect linear movement of the caliper housing 26 relative to the carrier 28. The secondary sensor 62 can for example be a linear induction sensor mounted on the caliper housing 26 via a mounting bracket 63 and be configured to sense movement of the caliper housing 26 during wear of the components, as caused by the automatic adjuster 25. A suitable example of the secondary sensor 62 is available for purchase from Microchip Technology, part number LXE3302AL002. Other types of sensors for sensing position of the respective components could also or instead be used. This type of linear induction sensor outputs signals to the controller 52 indicating the linear movement of the caliper housing 26.

Optionally, the system 50 includes an indicator device 64 configured to indicate one or more operational characteristics of the system 50 to the operator. The indicator device 64 can be in the cab of the vehicle and/or elsewhere on the vehicle, and/or remotely from the vehicle. The controller 52 is programmed to control the indicator device 64 so as to indicate to an operator the values sensed by the primary and secondary sensor 60, 62, and/or calculations made by the controller 52 based upon outputs from the primary and/or secondary sensors 60, 62, as will be further described herein below. The type and configuration of the indicator device 64 can vary and for example can include a display, such as a touchscreen display, display panel, and/or any other conventional means for communicating system characteristics to the operator.

thickness of the outer brake pad 16. The starting thickness of the inner brake pad 14 includes the starting thickness of the inner friction member 18 and the thickness of the inner backing plate 20. The starting thickness of the outer brake pad 16 includes the starting thickness of the outer friction member 22 and the thickness of the outer backing plate 24. These values can be separately entered via the noted input/output device 58, for example.

The technician further stores a known pad-to-rotor life ratio in the memory 56, which is a known ratio based upon historical lifetime performance of the particular rotor and brake pads installed in the system 50. An example of a pad-to-rotor life ratio is 3:1, i.e., wherein the inner and outer brake pads each are expected to wear out three times during the useful life of one rotor. The system 50 is further setup by the technician to store a look-up table that correlates various positions of the primary sensor 60 (in this non-limiting example a rotary potentiometer) to corresponding combined thicknesses of the rotor, the inner brake pad, and the outer brake pad. As described herein above, the position of the rotary potentiometer will vary during use as the adjuster 25 adjusts the position of the inner and outer brake pads 14, 16. Based on historical data, distinct rotational positions of the potentiometer can be directly correlated to distinct combined thicknesses of the rotor, the inner brake pad and the outer brake pad. These predictable relationships are stored in the memory 56, for example in a lookup table. The technician further stores a minimum permissible brake pad thickness, which is indicative of when a change of the inner and/or outer brake pads 14, 16 is recommended or required. The technician further stores a minimum permissible rotor thickness, which is indicative of when a change of the rotor 12 is recommended or required. Optionally the technician further stores a predetermined range of thicknesses, which as further described herein below corresponds to replacement of the both the rotor 12 and the inner and outer brake pads 14, 16.

Figure 5:
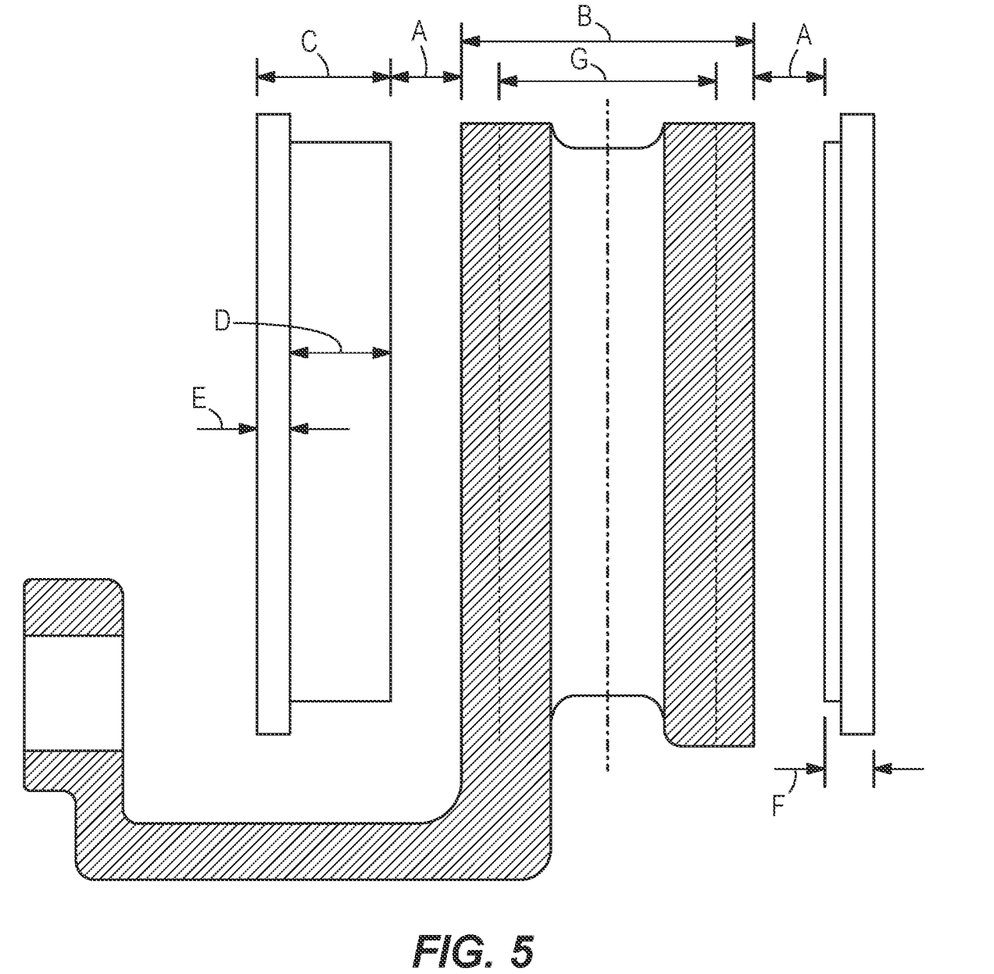
FIG. 5 is a schematic diagram illustrating setup parameters of a new rotor, a new inner friction member and inner backing plate of the disc brake, and a new outer friction member and outer backing plate of the disc brake.

Exemplary methods of the present invention are described herein below with reference to FIGS. 7 and 8. The exemplary methods begin with the initial setup numerical values shown in the table below, which are non-limiting and are shown only for the purpose of facilitating explanation of the present invention. In the following non-limiting example:

| FIG. 5 Reference | System Parameter | Example Setup Value |
|---|---|---|
| A | Gap between friction members and rotor (determined by the automatic adjuster) | Constant |
| B | Starting thickness of the rotor | 45 mm |
| C | Starting thickness of the inner brake pad | 30 mm |
| C | Staring thickness of the outer brake pad | 30 mm |
| D | Starting thickness of the inner friction member | 21 mm |
| D | Starting thickness of the outer friction member | 21 mm |
| E | Thickness of the inner backing plate | 9 mm |
| E | Thickness of the outer backing plate | 9 mm |
|  | Summation of the starting thickness of the rotor, starting thickness of the inner brake pad, starting thickness of the outer brake pad (B + 2C) | 105 mm |
| F | Predetermined minimum permissible thickness amount of inner or outer pad | 11 mm |
| G | Predetermined minimum permissible thickness amount of rotor | 37 mm |

Figure 6A:
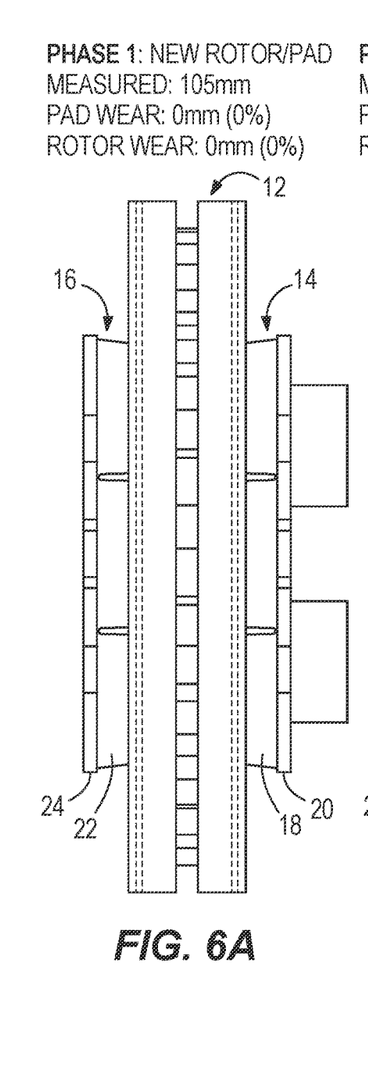
FIGS. 6A-6D illustrate various wear states of the disc brake and rotor.
Figure 6B:
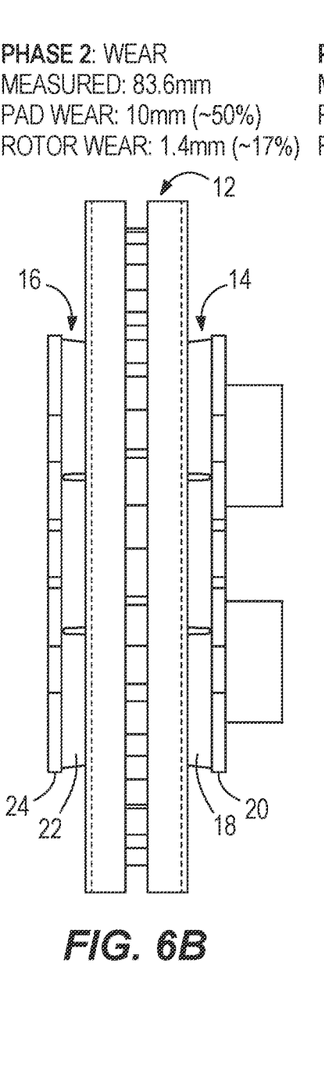
Figure 6C:
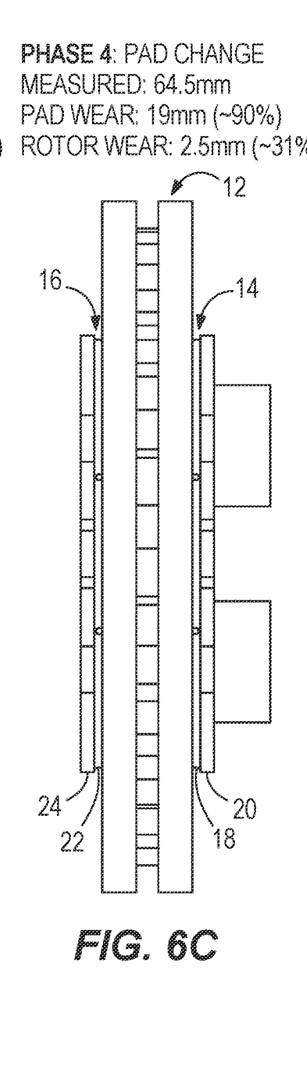
Figure 6D:
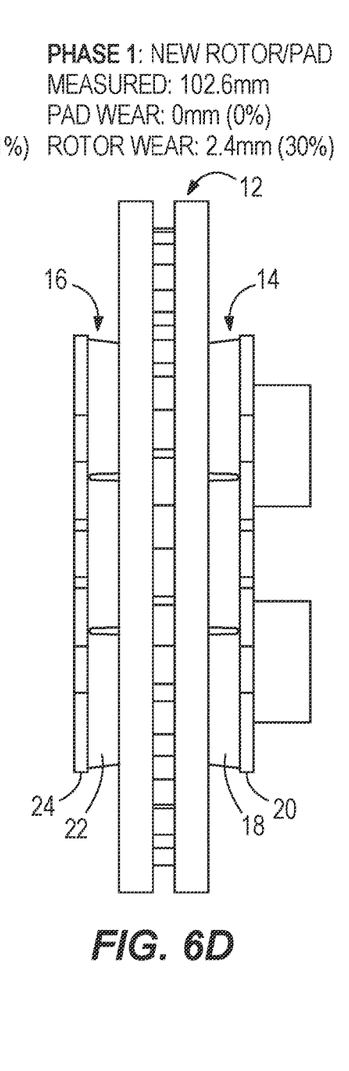

Referring to FIG. 5, during setup of the system 50, the technician stores various system parameters in the memory 56 of the controller 52. The stored parameters include known or measured parameters of the disc brake 10, including for example the starting thickness of the rotor 12, the starting thickness of the inner brake pad 14, and the starting FIGS. 6A-6D are a sequence of illustrations showing the disc brake 10 over the useful life of the rotor 12 and the inner and outer brake pads 14, 16. FIG. 6A illustrates a new rotor 12 and new inner and outer brake pads 14, 16. FIG. 6B illustrates the disc brake 10 after a period of use, wherein due to wear the thicknesses of the rotor 12 and the inner and outer friction members 18, 22 of the inner and outer brake pads 14, 16 have moderately decreased. FIG. 6C illustrates the disc brake 10 after a further period of use, wherein due to wear the thicknesses of the rotor 12 and the inner and outer friction members 18, 22 have reduced to a point where replacement is recommended or required. FIG. 6D depicts a state wherein the rotor 12 has remained but the inner and outer brake pads 14, 16 have been replaced.

FIGS. 6A-6D also illustrate applicable setup values from the example table above and exemplary characteristics measured by the primary sensor 60 and calculated by the controller 52. These values are non-limiting and are shown only for the purpose of facilitating explanation of the present invention.

Figure 7A:
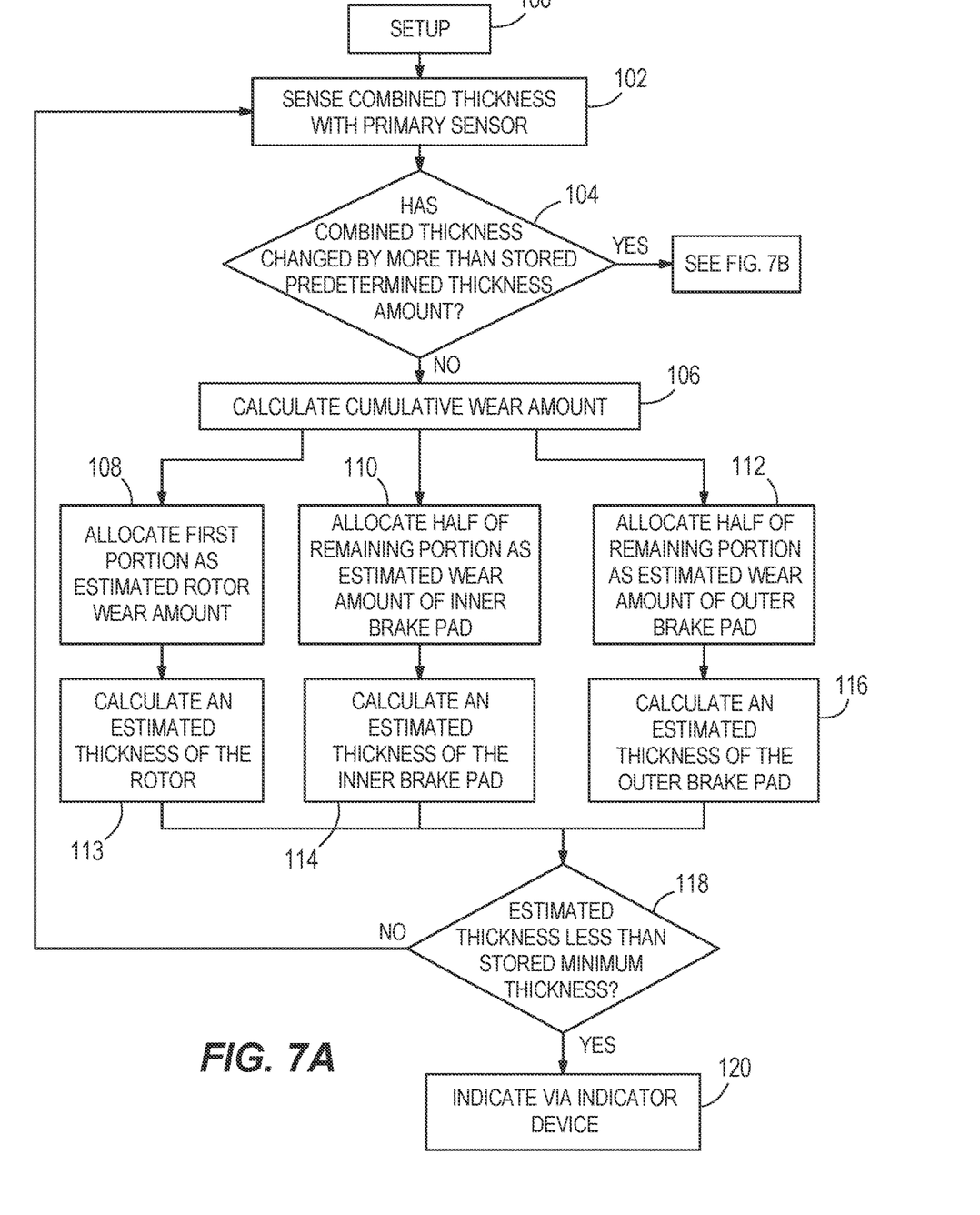
FIG. 7A is a flow chart illustrating an exemplary method according to the present disclosure.

FIG. 7A depicts an exemplary method of the present invention wherein the controller 52, based only on the values stored in the memory 56 and the combined thickness of the rotor, the inner brake pad, and the outer brake pad sensed by the primary sensor 60, is advantageously configured to calculate an estimated wear amount of the inner brake pad and an estimated wear amount of the outer brake pad.

At step 100, which corresponds to FIG. 6A, the above-described initial setup is conducted, including entering and operating the controller to calculate the setup values shown in the above table. In the illustrated example, the primary sensor senses a combined thickness of 105 mm. Because the rotor, inner brake pad, and outer brake pad are new, the sensed combined thickness (105 mm) equals the setup summation of the starting thickness of the rotor, starting thickness of the inner brake pad, and starting thickness of the outer brake pad (105 mm).

After a period of use of the disc brake, at step 102, which corresponds to FIG. 6B, the controller is programmed to determine a new combined thickness of the rotor, the inner brake pad, and the outer brake pad based upon the sensed position of the primary wear sensor. In the illustrated example, the primary wear sensor senses a combined thickness of 83.6 mm.

Figure 7B:
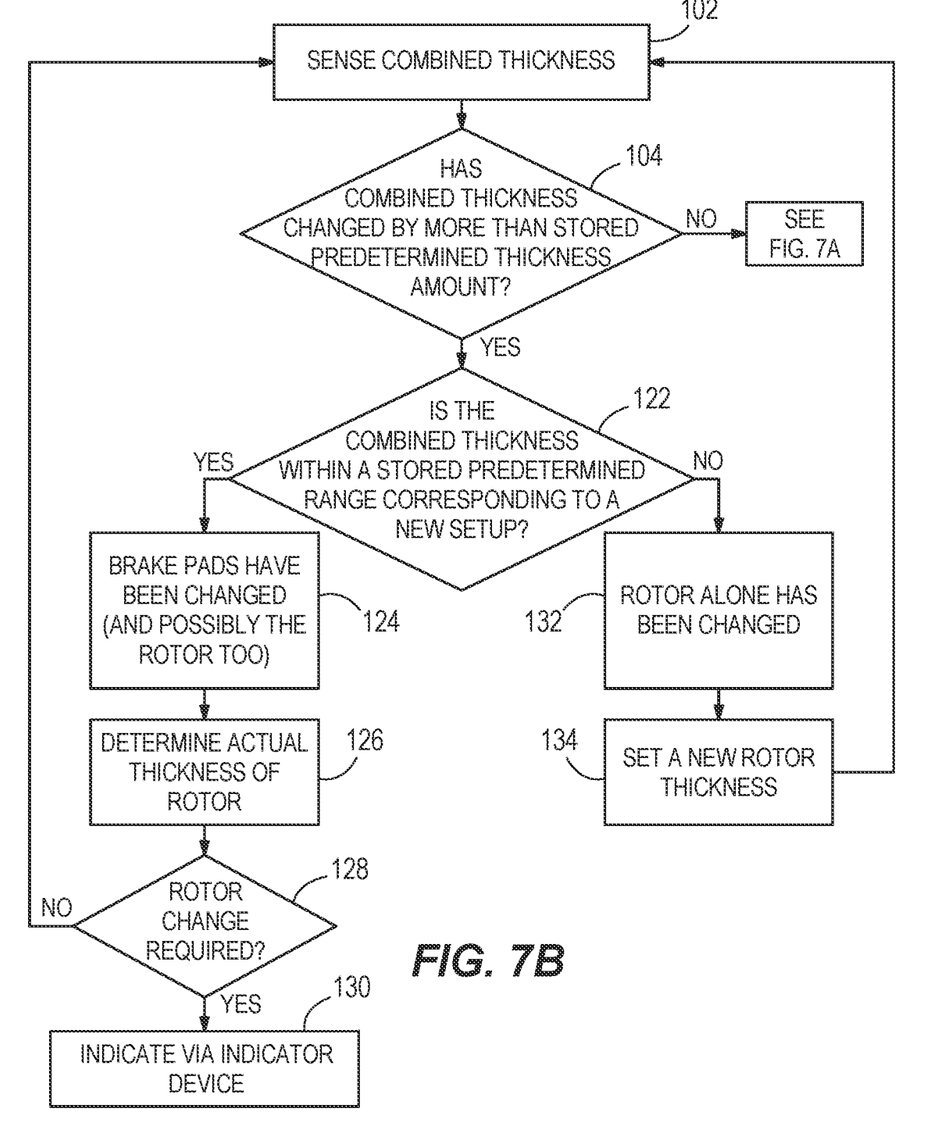
FIG. 7B is a flow chart illustrating further steps in the method according to FIG. 7A.

At step 104, the controller is programmed to determine whether at least one of the rotor, the inner brake pad, and the outer brake pad has been replaced since the last measurement. The controller determines this by calculating the difference in combined thickness of the rotor, the inner brake pad, and the outer brake pad sensed in steps 100 and 102. If from step 100 to step 102 the combined thickness has increased by more than a predetermined thickness amount stored in the memory, then the controller assumes that at least one of the rotor, the inner brake pad, and the outer brake pad has been replaced and the method proceeds as shown in FIG. 7B, which will be further described herein below. If from step 100 to step 102 the combined thickness has not increased by more than the predetermined thickness amount stored in the memory, then the method proceeds to step 106. An exemplary predetermined thickness for determining whether at least one of the rotor, the inner brake pad, and the outer brake pad has been replaced is 4 mm. In the illustrated example, the combined thickness sensed in steps 100 and 102 has decreased, so the method in this example proceeds to step 106.

At step 106, the controller is programmed to calculate a cumulative wear amount of the rotor, the inner brake pad, and the outer brake pad. This is accomplished by subtracting the combined thickness of the rotor, the inner brake pad, and the outer brake pad sensed at step 104 from the summation of the starting thickness of the rotor, the starting thickness of the inner brake pad, and the starting thickness of the outer brake pad. In the illustrated example this is 105 mm−83.6 mm=21.4 mm At step 108, based on a pad-to-rotor life ratio stored in the memory, the controller is programmed to allocate a first portion of the cumulative wear amount as an estimated rotor wear amount. In this example, the pad-to-rotor life ratio is 3:1. Both pads are expected to wear out at an average of 3 times for during the useful life of one rotor. Applying this ratio to the cumulative wear amount calculated in step 106 results in 1.4 mm of the cumulative wear amount that is allocated to rotor wear, on both sides of the rotor.

At step 110, the controller is programmed to allocate a first half of the remaining portion of the cumulative wear amount of the rotor, the inner brake pad, and the outer brake pad as the estimated wear amount of the inner brake pad. The remaining portion of the cumulative wear amount of the rotor is 21.4 mm−1.4 mm=20 mm. Allocating half of 20 mm to the estimated wear amount of the inner brake pad equals 10 mm.

At step 112, the controller is programmed to allocate the other half of the remaining second portion of the cumulative wear amount of the rotor, the inner brake pad, and the outer brake pad as the estimated wear amount of the outer brake pad. This equals 10 mm.

Optionally at step 113, the controller can be programmed to calculate an estimated thickness of the rotor by subtracting the cumulative wear amount of the rotor from the starting thickness of the rotor. 45 mm−1.4 mm=43.6 mm.

At step 114, the controller is programmed to calculate an estimated thickness of the inner brake pad by subtracting the estimated wear amount of the inner brake pad from the starting thickness of the inner brake pad. 30 mm−10 mm=20 mm.

At step 116, the controller is programmed to calculate an estimated thickness of the outer brake pad by subtracting the estimated wear amount of the outer brake pad from the starting thickness of the outer brake pad. 30 mm−10 mm=20 mm.

The controller is further programmed to store the estimated thickness of the inner brake pad as a new starting thickness of the inner brake pad, and to store the estimated thickness of the outer brake pad as a new starting thickness of the outer brake pad.

At step 118, the controller is programmed to determine whether a brake pad change is required. This is determined if the estimated thickness of the inner brake pad or the estimated thickness of the outer brake pad calculated at steps 114 and 116, respectively, is less than the minimum permissible brake pad thickness stored in the memory. If it is, at step 120, the controller is programmed to control the indicator device to indicate the need for a brake pad change to the operator of the system. If it is not, the controller is programmed to repeat steps 102-118, as shown.

Referring to the example in FIG. 6B, as described above the controller determines an estimated thicknesses of the inner and outer brake pads of 20 mm. This is greater than the stored minimum permissible thickness amount of the inner or outer pad of 10 mm in the memory. Thus in the example of FIG. 6B, the controller will begin again at step 102, and calculate the values shown in FIG. 6C, when the primary sensor senses a new combined thickness of 64.5 mm. In the example of FIG. 6C, the controller follows method steps 102-118 which determines an estimated thickness of the rotor of 42.5 mm and an estimated thickness of the inner and outer brake pads of 9.5 mm. The estimated thickness of the inner and outer brake pads of 9.5 mm is less than the stored minimum permissible thickness amount of the inner or outer pad of 10 mm in the memory. Thus in the example of FIG. 6C, the controller will proceed to step 120 and control the indicator device to alert the operator that a brake pad change is recommended or required.

FIG. 7B illustrates method steps when at step 104 the controller determines that the combined thickness sensed at step 102 has changed by more than the predetermined amount.

At step 122, the controller determines whether the sensed combined thickness is within a predetermined range of thicknesses stored in the memory, which corresponds to a new system setup having a new rotor, inner brake pad, and outer brake pad. An example of such a stored predetermined range of thicknesses is within 7 mm of the summation of the starting thickness of the rotor, starting thickness of the inner brake pad, starting thickness of the outer brake pad. As such, the range is 98 mm-105 mm. If the combined thickness sensed at step 102 is within this range, then the controller at step 124 is programmed to assume that the inner and outer brake pads have been replaced, and possibly the rotor too. If not, then the controller at step 134 is programmed to assume that only the rotor has been replaced. In that case, the controller proceeds to method step 134. In the example shown in FIG. 6D, the sensed combined thickness is 102.6, which is within the stored range. Thus in the example of FIG. 6D, the controller would assume the inner and outer brake pads have been changed and proceeds to step 126.

When the controller assumes that at least the inner brake pad and outer brake pad have been replaced, the controller is further programmed at step 126 to determine an actual rotor thickness by subtracting the starting thickness of the inner and outer brake pads from the new combined thickness of the rotor, the inner brake pad, and the outer brake pad sensed by the primary wear sensor at step 102. In the example of FIG. 6D, this is 102.6 mm−2(30 mm)=42.6 mm.

At step 128, the controller is further programmed to determine that a rotor change is required when the actual thickness of the rotor is less than a minimum rotor thickness stored in the controller. If yes, the controller is programmed at step 130 to control the indicator device to indicate the need for a brake pad change to the operator of the system. If no, then the controller is programmed to begin again at step 102, as shown. In the example of FIG. 6D, the actual thickness of the rotor is 42.6 mm which is more than the stored predetermined minimum permissible thickness amount of rotor of 37 mm. Thus the controller in FIG. 6D is configured to save the actual thickness of the rotor (42.6 mm) as the new starting thickness of the rotor and resets the starting inner and outer brake pad thicknesses as 30 mm each and the method begins again at step 102. Optionally, the controller can also be further programmed to calculate and store a new pad-to-rotor life ratio in the memory based upon the actual rotor wear amount and the cumulative wear amount of the inner brake pad, the outer brake pad, and the rotor. More specifically, this value can be obtained by taking the inverse of the rotor wear percentage throughout the life of the previously worn brake pads. In the example of FIG. 6C, this percentage is equal to the final rotor wear percent when the brake pad was first installed, 0%, resulting in a 31% wear during the life of the brake pads. Furthermore, the new pad-to-rotor life ratio can be calculated to be the inverse of 31%, or approximately 3.2.

Figure 8A:
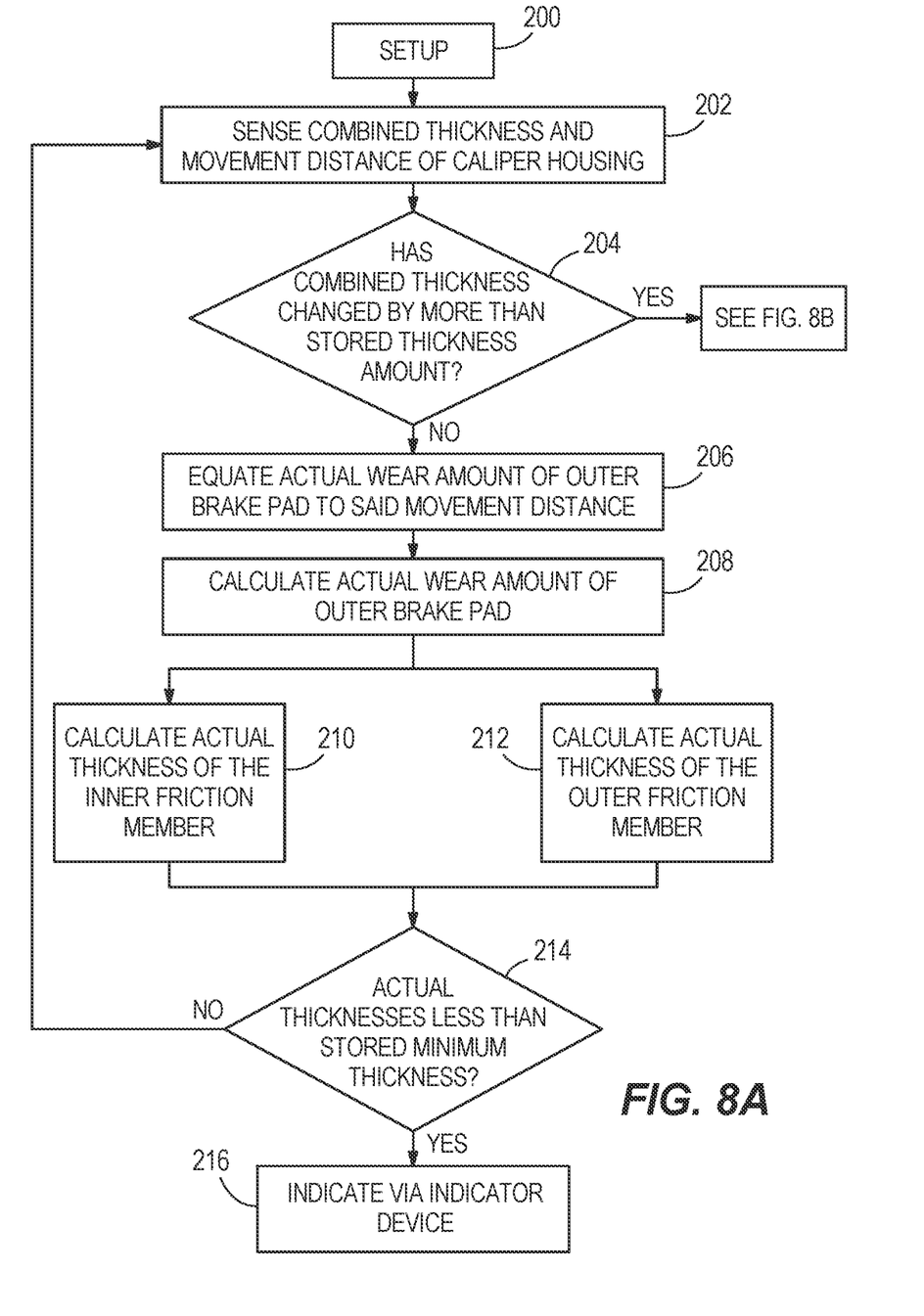
FIG. 8A is a flow chart illustrating another exemplary method according to the present disclosure.

FIG. 8A depicts an example method according to the present invention wherein the controller 52, based on (1) the setup parameters stored in the memory 56, (2) the combined thickness of the rotor, the inner brake pad, and the outer brake pad sensed by the primary sensor 60, and (3) a movement distance of the caliper housing sensed by the secondary sensor 62, is advantageously configured to calculate actual wear amounts and thicknesses of the rotor, the inner brake pad, and the outer brake pad.

Steps 200-204 are the same as steps 100-104, described herein above.

At step 206, the controller is programmed to equate the actual wear amount of the outer brake pad to the movement distance of the caliper housing sensed by the secondary wear sensor.

At step 208, the controller is programmed to calculate the actual wear amount of the inner brake pad by subtracting the movement distance of the caliper sensed by the secondary wear sensor from the combined thickness of the inner brake pad sensed by the primary wear sensor.

At step 210, the controller is further programmed to calculate the actual thickness of the inner brake pad by subtracting the actual wear amount of the inner brake pad from the starting thickness of the inner brake pad. Optionally, the controller can be programmed to calculate the actual thickness of the friction member by subtracting the actual wear amount of the inner brake pad and the starting thickness of the inner backing plate from the starting thickness of the inner brake pad.

At step 212, the controller is further programmed to calculate the actual thickness of the outer brake pad by subtracting the actual wear amount of the outer brake pad from the starting thickness of the outer brake pad. Optionally, the controller can be programmed to calculate the actual thickness of the outer friction member by subtracting the actual wear amount of the outer brake pad and the thickness of the outer backing plate from the starting thickness of the inner brake pad.

The controller is further programmed to store the actual thickness of the inner brake pad calculated at step 210 as a new starting thickness of the inner brake pad, and to store the actual thickness of the outer brake pad calculated at step 212 as a new starting thickness of the outer brake pad.

At step 214, the controller is further programmed to determine that a brake pad change is required when the actual thickness of the inner brake pad calculated at step 210 or the actual thickness of the outer brake pad calculated at step 212 is less than a minimum brake pad thickness stored in the memory. If it is, then at step 216, the controller is further programmed to control the indicator device to indicate the need for a brake pad change to the operator of the system. If it is not, then the controller begins the method again at step 202, as shown, such that the primary wear sensor thereafter senses a new combined thickness of the rotor, the inner brake pad, and the outer brake pad.

Figure 8B:
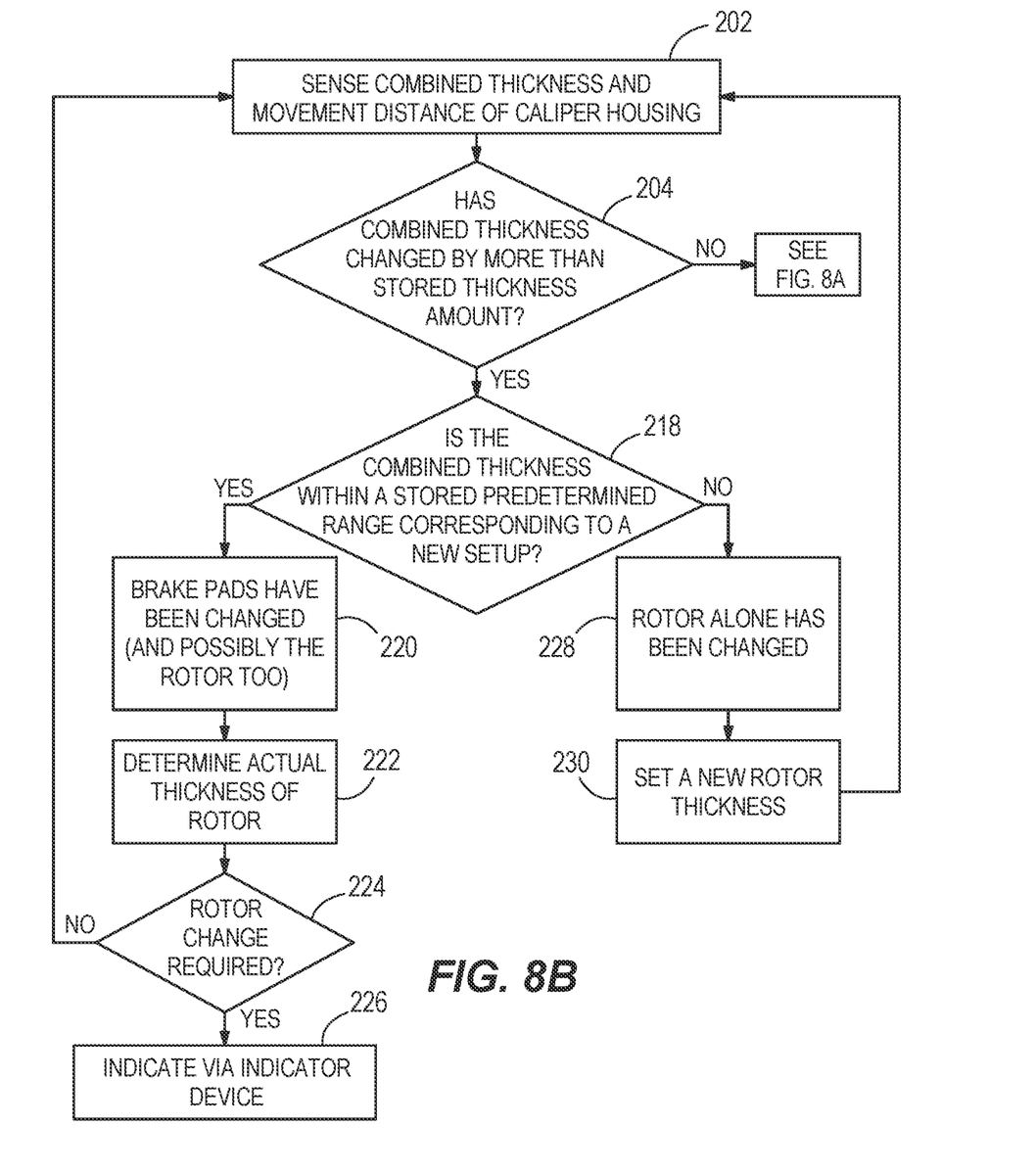
FIG. 8B is a flow chart illustrating further steps in the method according to FIG. 8A.

If at step 202, the controller determines that at least one of the rotor, the inner brake pad, and the outer brake pad has been replaced, then the controller proceeds to the method illustrated in FIG. 8b, which is the same as the method illustrated in FIG. 7B, as described herein above.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus <10% of the particular term and "substantially" and "significantly" will mean plus or minus >10% of the particular term.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for monitoring a wear state of a disc brake for braking a rotor of a vehicle, the system comprising the disc brake having a caliper configured to clamp opposing inner and outer brake pads onto the rotor; a primary wear sensor configured to sense a combined thickness of the rotor, the inner brake pad, and the outer brake pad; and a controller programmed to calculate an estimated wear amount of the inner brake pad and an estimated wear amount of the outer brake pad based upon said combined thickness of the rotor, the inner brake pad, and the outer brake pad sensed by the primary wear sensor, wherein the controller comprises a memory storing a starting thickness of the rotor, a starting thickness of the inner brake pad, and a starting thickness of the outer brake pad, and wherein said starting thickness of the inner brake pad comprises a starting thickness of an inner friction member and a thickness of an inner backing plate, and further wherein said starting thickness of the outer brake pad comprises a starting thickness of an outer friction member and a thickness of an outer backing plate.

2. The system according to claim 1, further comprising an indicator device, and wherein the controller is further programmed to control the indicator device to indicate a characteristic of the system to an operator.

3. The system according to claim 2, wherein the characteristic of the system comprises at least one of:
   i. a brake pad change is required, and
   ii. a rotor change is required.

4. A system for monitoring a wear state of a disc brake for braking a rotor of a vehicle, the system comprising the disc brake having a caliper configured to clamp opposing inner and outer brake pads onto the rotor; a primary wear sensor configured to sense a combined thickness of the rotor, the inner brake pad, and the outer brake pad; and a controller programmed to calculate an estimated wear amount of the inner brake pad and an estimated wear amount of the outer brake pad based upon said combined thickness of the rotor, the inner brake pad, and the outer brake pad sensed by the primary wear sensor, wherein the controller comprises a memory storing a starting thickness of the rotor, a starting thickness of the inner brake pad, and a starting thickness of the outer brake pad, and wherein the controller is further programmed to calculate said estimated wear amount of the inner brake pad and said estimated wear amount of the outer brake pad by
   a. calculating a cumulative wear amount of the rotor, the inner brake pad, and the outer brake pad by subtracting said combined thickness of the rotor, the inner brake pad, and the outer brake pad sensed by the primary wear sensor from a summation of said starting thickness of the rotor, said starting thickness of the inner brake pad, and said starting thickness of the outer brake pad;
   b. based on a pad-to-rotor life ratio stored in the controller, allocating a first portion of said cumulative wear amount as an estimated rotor wear amount; and
   c. allocating a first half of a remaining second portion of said cumulative wear amount of the rotor, the inner brake pad, and the outer brake pad as the estimated wear amount of the inner brake pad and allocating a second half of the remaining second portion of said cumulative wear amount of the rotor, the inner brake pad, and the outer brake pad as the estimated wear amount of the outer brake pad.

5. The system according to claim 4, wherein the controller is further programmed to calculate an estimated thickness of the inner brake pad by subtracting said estimated wear amount of the inner brake pad from said starting thickness of the inner brake pad, and wherein the controller is further programmed to calculate an estimated thickness of the outer brake pad by subtracting said estimated wear amount of the outer brake pad from said starting thickness of the outer brake pad.

6. The system according to claim 5, wherein the controller is further programmed to store said estimated thickness of the inner brake pad as a new starting thickness of the inner brake pad, and wherein the controller is further programmed to store said estimated thickness of the outer brake pad as a new starting thickness of the outer brake pad, and further wherein the controller is further programmed to repeat steps a-c when the primary wear sensor thereafter senses a new combined thickness of the rotor, the inner brake pad, and the outer brake pad.

7. The system according to claim 6, wherein the controller is further programmed to determine that a brake pad change is required when said estimated thickness of the inner brake pad or said estimated thickness of the outer brake pad is less than a minimum permissible brake pad thickness stored in the controller.

8. The system according to claim 7, wherein the controller is further programmed to determine that at least one of the rotor, the inner brake pad, and the outer brake pad has been replaced when said new combined thickness of the rotor, the inner brake pad, and the outer brake pad sensed by the primary wear sensor has increased by more than a predetermined thickness amount stored in the controller.

9. The system according to claim 8, wherein the controller is further programmed to determine that the inner and outer brake pads have been replaced when said new combined thickness of the rotor, the inner brake pad, and the outer brake pad sensed by the primary wear sensor is within a predetermined range of thicknesses stored in the controller, the predetermined range of thicknesses corresponding to a known combined thickness of a new rotor, inner brake pad, and outer brake pad; and wherein the controller is further programmed to determine that only the rotor has been replaced when said new combined thickness of the rotor, the inner brake pad, and the outer brake pad sensed by the primary wear sensor is not in said predetermined range of thicknesses.

10. The system according to claim 9, wherein when the controller determines that the inner brake pad and the outer brake pad have been replaced, the controller is further programmed to calculate an actual rotor wear amount by subtracting said new combined thickness of the rotor, the inner brake pad, and the outer brake pad sensed by the primary wear sensor from said summation of said starting thickness of the rotor, said starting thickness of the inner brake pad, and said starting thickness of the outer brake pad.

11. The system according to claim 10, wherein the controller is further programmed to calculate an actual thickness of the rotor by subtracting said actual rotor wear amount from said starting thickness of the rotor.

12. The system according to claim 11, wherein the controller is further programmed to determine that a rotor change is required when said actual thickness of the rotor is less than a minimum rotor thickness stored in the controller.

13. The system according to claim 10, wherein the controller is further programmed to calculate and store a new pad-to-rotor life ratio based upon said actual rotor wear amount and said cumulative wear amount of the inner brake pad, the outer brake pad, and the rotor.

14. A method for monitoring a wear state of a disc brake for braking a rotor of a vehicle, the disc brake comprising having a caliper configured to clamp opposing inner and outer brake pads onto the rotor, the method comprising calculating via a controller an estimated wear amount of the inner brake pad and an estimated wear amount of the outer brake pad based upon a combined thickness of the rotor, the inner brake pad, and the outer brake pad, as sensed by a primary wear sensor, and further comprising calculating via the controller said estimated wear amount of the inner brake pad and said estimated wear amount of the outer brake pad by
   a. calculating a cumulative wear amount of the rotor, the inner brake pad, and the outer brake pad, by subtracting said combined thickness of the rotor, the inner brake pad, and the outer brake pad sensed by the primary wear sensor from a summation of a starting thickness of the rotor, a starting thickness of the inner brake pad, and a starting thickness of the outer brake pad;
   b. based on a pad-to-rotor life ratio stored in the controller, allocating a first portion of said cumulative wear amount as an estimated rotor wear amount; and
   c. allocating a first half of a remaining second portion of said cumulative wear amount of the rotor, the inner brake pad, and the outer brake pad as the estimated wear amount of the inner brake pad and allocating a second half of the remaining second portion of said cumulative wear amount of the rotor, the inner brake pad, and the outer brake pad as the estimated wear amount of the outer brake pad.

15. The method according to claim 14, further comprising calculating an estimated thickness of the inner brake pad by subtracting said estimated wear amount of the inner brake pad from said starting thickness of the inner brake pad, and calculating an estimated thickness of the outer brake pad by subtracting said estimated wear amount of the outer brake pad from said starting thickness of the outer brake pad.

16. The method according to claim 15, storing in the controller said estimated thickness of the inner brake pad as a new starting thickness of the inner brake pad, and storing said estimated thickness of the outer brake pad as a new starting thickness of the outer brake pad, and repeating steps a-c when the primary wear sensor thereafter senses a new combined thickness of the rotor, the inner brake pad, and the outer brake pad.

17. A system for monitoring a wear state of a disc brake for braking a rotor of a vehicle, the system comprising the disc brake having a caliper configured to clamp opposing inner and outer brake pads onto the rotor; a primary wear sensor configured to sense a combined thickness of the rotor, the inner brake pad, and the outer brake pad; a secondary wear sensor configured to sense a movement distance of the caliper, and a controller programmed to determine an actual wear amount of the inner brake pad and an actual wear amount of the outer brake pad based upon said combined thickness of the rotor, the inner brake pad, and the outer brake pad sensed by the primary wear sensor and said movement distance of the caliper sensed by the secondary wear sensor.

18. The system according to claim 17, wherein the controller is programmed to
   (a) equate the actual wear amount of the outer brake pad to said movement distance of the caliper sensed by the secondary wear sensor and
   (b) calculate the actual wear amount of the inner brake pad by subtracting said movement distance of the caliper sensed by the secondary wear sensor from the combined thickness of the inner brake pad sensed by the primary wear sensor.

19. A method for monitoring wear state of a disc brake for braking a rotor of a vehicle, the disc brake having a caliper configured to clamp opposing inner and outer brake pads onto the rotor, the method comprising sensing a combined thickness of the rotor, the inner brake pad, and the outer brake pad; sensing movement distance of the caliper; and
   determining via a controller an actual wear amount of the inner brake pad and an actual wear amount of the outer brake pad based upon said combined thickness of the rotor, the inner brake pad, and the outer brake pad, as sensed by a primary wear sensor and said movement distance of the caliper, as sensed by a secondary wear sensor.

20. The method according to claim 19, further comprising calculating via the controller an actual thickness of an inner friction member by subtracting the actual wear amount of the inner brake pad and a thickness of an inner backing plate from a starting thickness of the inner brake pad; and calculating via the controller the actual thickness of an outer friction member by subtracting the actual wear amount of the outer brake pad and a thickness of an outer backing plate from a starting thickness of the outer brake pad.

21. The method according to claim 20, further comprising determining that at least one of the rotor, the inner brake pad, and the outer brake pad has been replaced when a new combined thickness of the rotor, the inner brake pad, and the outer brake pad, as sensed by the primary wear sensor, has increased by more than a predetermined amount stored in the controller.

* * * * *